(12) United States Patent
Cable et al.

(10) Patent No.: US 10,638,861 B2
(45) Date of Patent: May 5, 2020

(54) CARAFE LID EXTENSION SYSTEM AND METHOD

(71) Applicant: BUNN-O-MATIC CORPORATION, Springfield, IL (US)

(72) Inventors: Fred Cable, Springfield, IL (US); Todd Anhalt, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 15/026,215

(22) PCT Filed: Sep. 30, 2014

(86) PCT No.: PCT/US2014/058423
§ 371 (c)(1),
(2) Date: Mar. 30, 2016

(87) PCT Pub. No.: WO2015/048786
PCT Pub. Date: Apr. 2, 2015

(65) Prior Publication Data
US 2016/0235227 A1 Aug. 18, 2016

Related U.S. Application Data

(60) Provisional application No. 61/884,617, filed on Sep. 30, 2013.

(51) Int. Cl.
| A47G 19/14 | (2006.01) |
| A47J 36/14 | (2006.01) |
| A47J 31/44 | (2006.01) |
| A47J 36/06 | (2006.01) |

(52) U.S. Cl.
CPC ............ *A47G 19/145* (2013.01); *A47G 19/14* (2013.01); *A47J 31/44* (2013.01); *A47J 36/06* (2013.01); *A47J 36/14* (2013.01)

(58) Field of Classification Search
CPC ....... A47G 19/145; A47G 19/14; A47J 31/44; A47J 36/14; A24J 36/06
USPC ............................................... 222/475.1, 571
See application file for complete search history.

(56) References Cited

U.S. PATENT DOCUMENTS

| 221,057 A | 10/1879 | Hall |
| 608,103 A | 7/1893 | Brown |
| 1,665,037 A | 4/1928 | Massing |
| 2,167,476 A | 7/1939 | Bernhard |
| (Continued) | | |

FOREIGN PATENT DOCUMENTS

| CN | 201873192 U | 6/2011 |
| DE | 1121492 | 1/1962 |
| WO | WO 82/002370 | 7/1982 |

OTHER PUBLICATIONS

Search Report and Written Opinion issued App. No. PCT/US2014/058423 (2015).

*Primary Examiner* — Patrick M. Buechner
*Assistant Examiner* — Michael J. Melaragno
(74) *Attorney, Agent, or Firm* — Barnes & Thornburg LLP (57) ABSTRACT

The present disclosure relates to a beverage serving device such as a carafe which includes structures and methods of operation for preventing dripping of beverage from the pouring spout after dispensing as well as improve control of liquid flow during dispensing and the structure and function of an extension portion of the cover or lid carried on the carafe.

30 Claims, 7 Drawing Sheets

(56) References Cited

U.S. PATENT DOCUMENTS

| | | | |
|---|---|---|---|
| 2,272,798 A | | 2/1942 | Hacmac |
| 2,272,867 A | | 2/1942 | Cobel |
| 2,274,849 A | | 3/1942 | Peterson |
| 2,378,355 A | | 6/1945 | Cobel |
| 2,587,344 A | | 2/1952 | Gould |
| 2,705,095 A | * | 3/1955 | Neuman ............... B65D 51/04 215/392 |
| 2,944,691 A | | 3/1955 | Neuman |
| 3,075,453 A | | 1/1963 | Wagner et al. |
| 3,212,686 A | | 10/1965 | Di Pierro et al. |
| 3,632,025 A | | 1/1972 | Bloomfield et al. |
| 3,844,450 A | * | 10/1974 | Johnson ............. A47J 41/0016 222/183 |
| 4,257,525 A | | 3/1981 | Thompson |
| 5,497,917 A | * | 3/1996 | Krimmel ............... A47G 19/12 220/715 |
| 6,474,514 B1 | | 11/2002 | Guillemin et al. |
| 6,505,752 B1 | * | 1/2003 | Rolfes ................. A47J 41/0016 215/13.1 |
| 6,817,280 B2 | | 11/2004 | Hall et al. |
| 7,735,698 B2 | * | 6/2010 | Lin .................... A47J 41/0027 222/472 |
| 2003/0052139 A1 | * | 3/2003 | Boyte .................. A47G 19/14 222/475.1 |
| 2005/0039606 A1 | | 2/2005 | Hall et al. |

\* cited by examiner

CARAFE LID EXTENSION SYSTEM AND METHOD

CROSS REFERENCE TO RELATED APPLICATIONS

This application is a U.S. nationalization under 35 U.S.C. § 371 of International Application No. PCT/US2014/058423, filed Sep. 30, 2014, which claims the benefit of priority under 35 U.S.C. § 119(e) to U.S. Provisional Patent Application No. 61/884,617, Filed Sep. 30, 2013. The disclosures set forth in the referenced applications are incorporated herein by reference in their entireties.

BACKGROUND

The present disclosure relates to a beverage serving device such as a carafe which includes structures and methods of operation for preventing dripping of beverage from the pouring spout after dispensing as well as improve control of liquid flow during dispensing and the structure and function of an extension portion of the cover or lid carried on the carafe.

By way of review, a variety of beverage dispensers are available. The present disclosure focuses on beverage dispensers which include a container defining a cavity, a grip or handle associated with the container, and a pouring assembly. Prior art servers such as carafes are generally well known. Such carafes include a container defining a cavity and have a formed spout having a lip in the area of a rim. A variety of such carafes have been developed from a variety of materials.

One of the problems associated with this type of carafe is that during pouring of beverage from inside of the cavity through the mouth, the flow can be challenging to control. Additionally, when pouring is ceased a small quantity of beverage can accumulate on the lip portion of the rim. Often times this small quantity, in the form of a drip, can release from the structure or drip off of the lip and/or follow the bottom of the lip down and run down the outside surface of the container. It appears that once a drip starts forming on the outside of a container a trail of substance left by the initial drip may provide a path of least resistance for subsequent drips to from and follow. As such, it is desirable to prevent the starting of any drips to reduce the likelihood that a drip path will be formed on the external surface of the container.

Some lack of control during pouring can also cause or enhance spilling and messes. The drips running down the outside of the container body can accumulate causing unsightly or difficult to removable staining or deposits, depending on the material, on the container and at least require extra effort in washing the container. Additionally, drips that run down the side of the container can drip onto corresponding surfaces such as table cloths, clothing, counters, rugs and other surfaces.

It would be desirable to develop a dispenser or carafe having a pouring assembly which reduces or eliminates dripping. It would also be desirable to develop such a carafe and methods of pouring which helps improve the control of pouring.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 1:
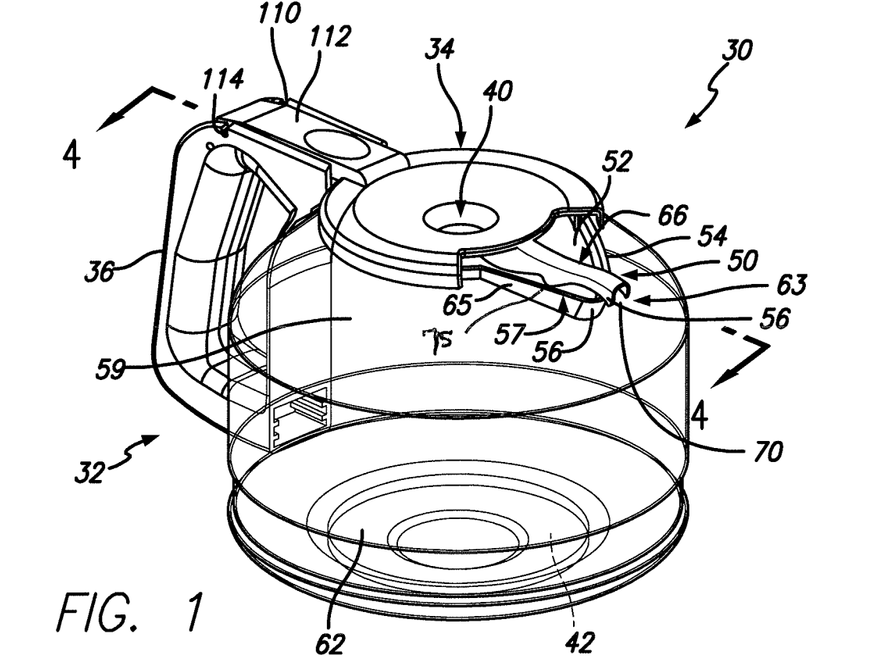
FIG. 1 is a perspective view of a carafe including a container defining a cavity therein, a pouring assembly associated with the container, and a grip or handle associated with the container.
Figure 2:
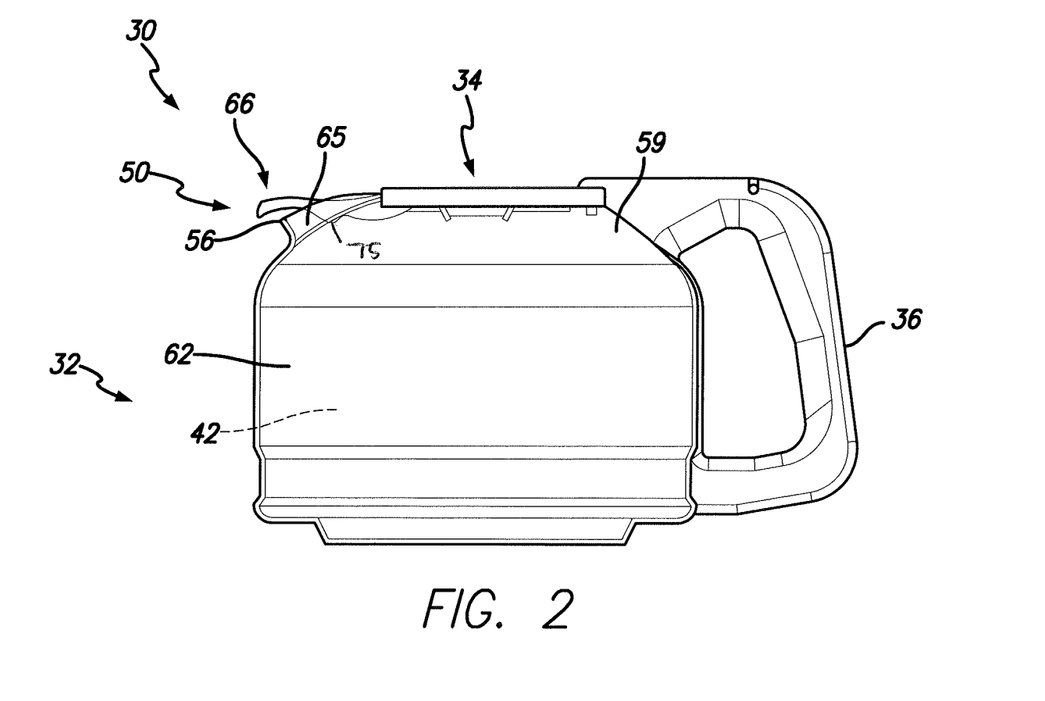
FIG. 2 is a side elevational view of the carafe as shown in FIG. 1 identifying additional relationships between the components briefly described in FIG. 1 and as described in more detail in the specification.
Figure 3:
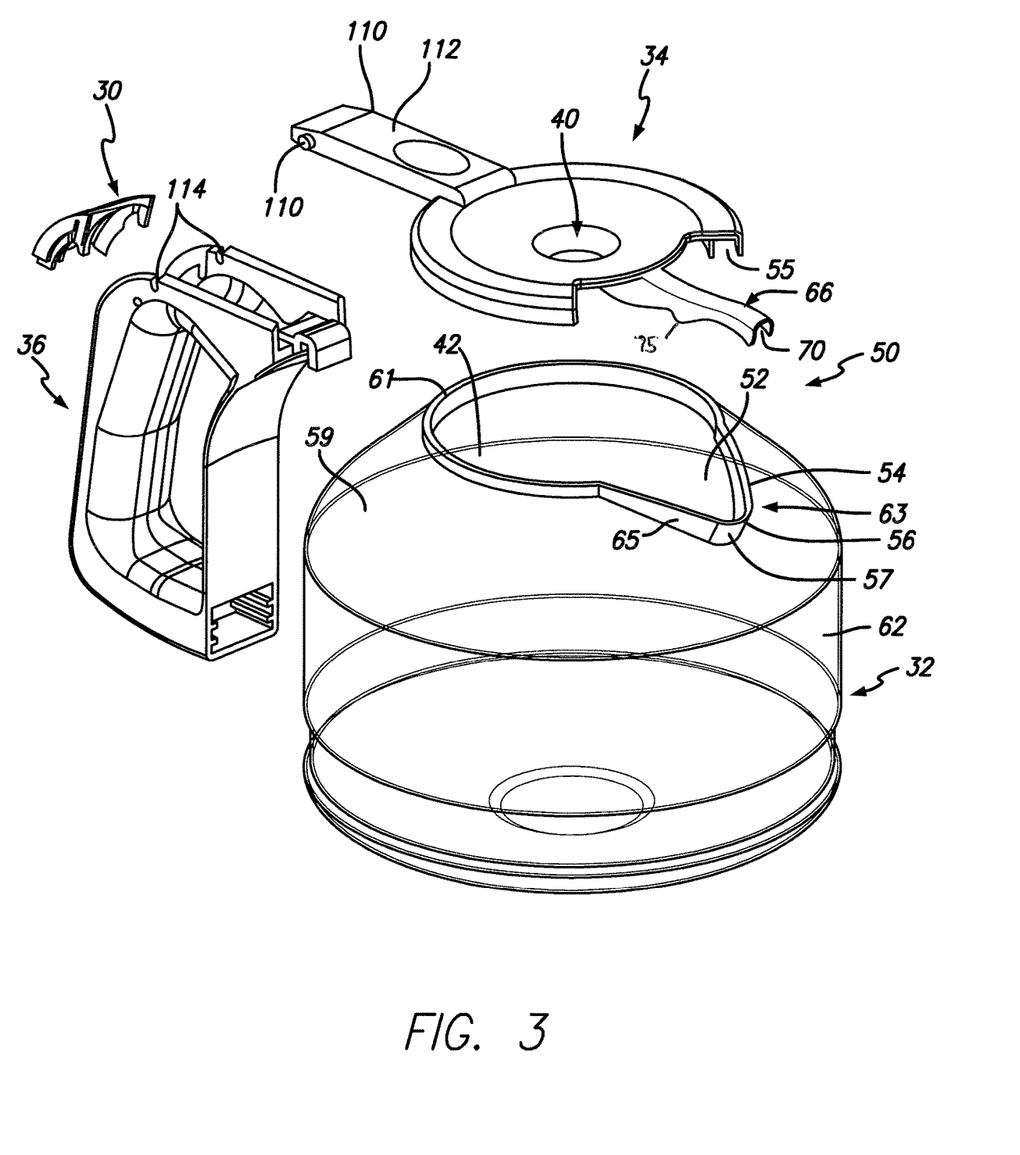
FIG. 3 is an exploded perspective view of the carafe shown in FIG. 1 showing a lid portion of the pouring assembly exploded from the container portion, and a handle assembly also removed from the container portion.

FIG. 1 shows a perspective view of a dispenser or carafe 30 for use in containing and dispensing liquid and/or beverages. The carafe 30 includes a container portion 32, a lid portion 34, and a grip or handle portion 36. The carafe 30 can be used in association with a beverage maker such as a beverage brewing device. In such a beverage brewing device coffee, tea, or other beverage is dispensed from the device generally in a stream. The stream flows from the brewer through an opening 40 defined by the lid 34. The beverage dispensed through the opening 40 collects within a cavity 42 defined by the wall or walls, bottom, and any other structures of the container 32.

Figure 6:
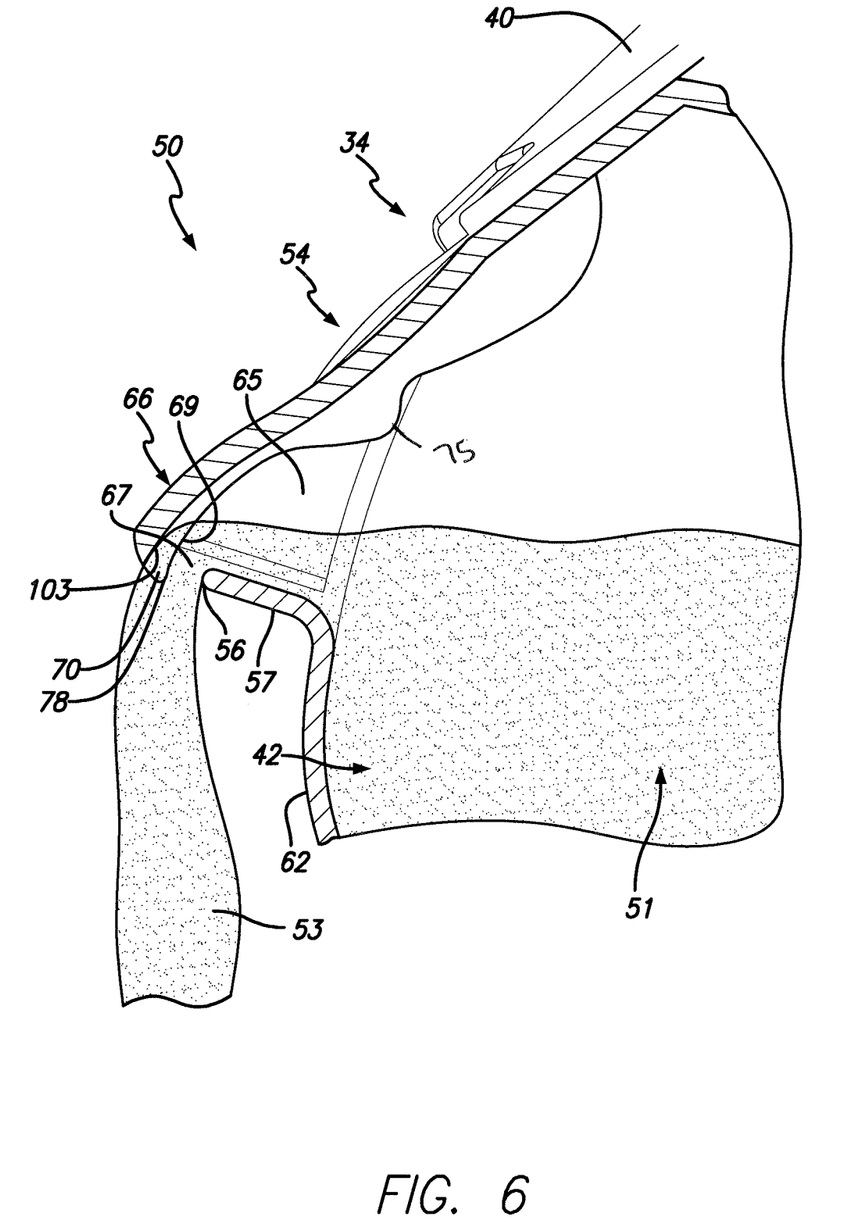
FIG. 6 is the enlarged view of FIG. 5 in which the carafe has been tipped to cause pouring of liquid from the carafe over the lip and beyond the extending portion.
Figure 7:
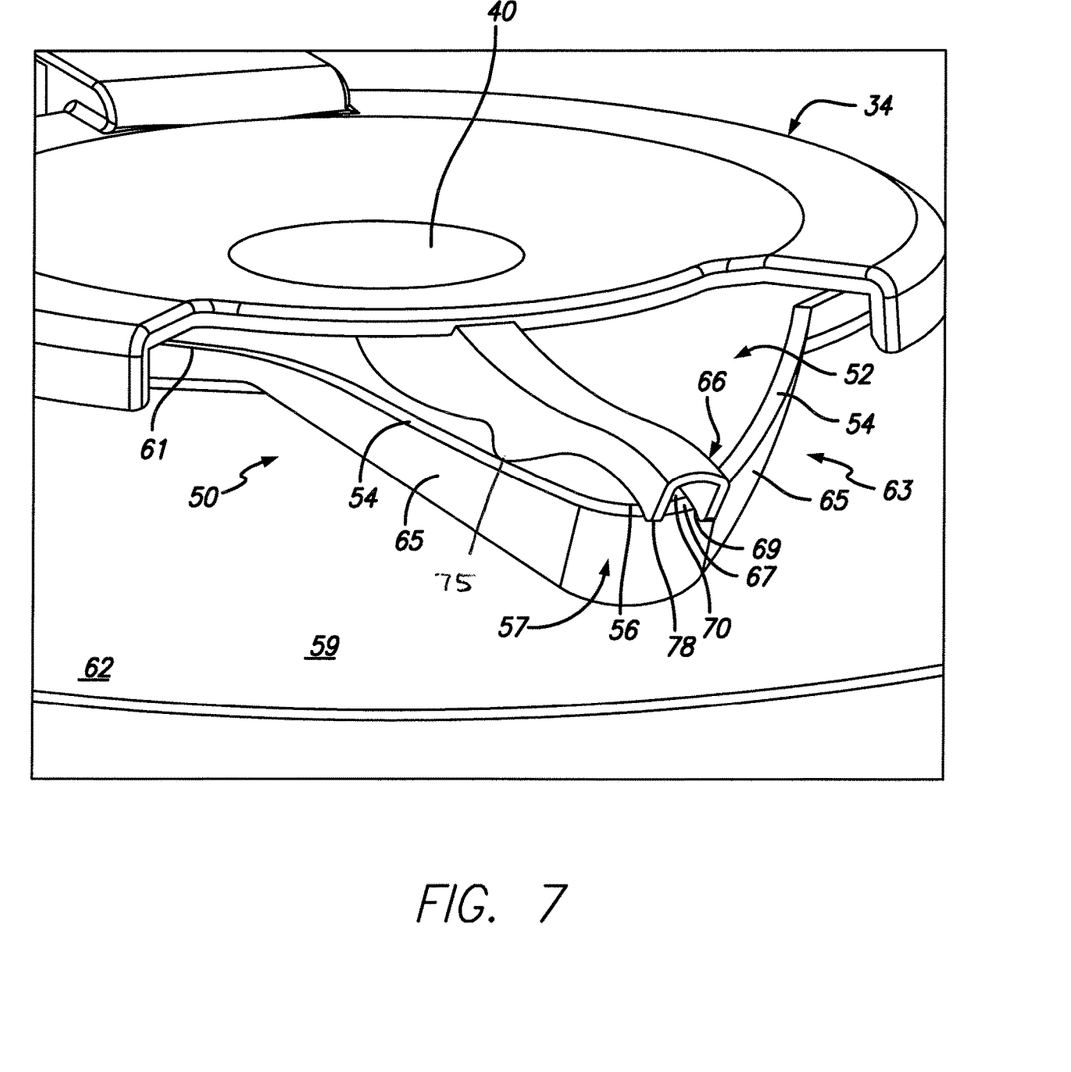
FIG. 7 is an enlarged perspective view of the pouring assembly showing the relationship of the lid portion with the extending portion positioned relative thereto and extending through the mouth along and proximate to the lip also showing a channel along an underside of the extending portion to help facilitate control of liquid flowing through the mouth of the pouring assembly and return of liquid to the cavity after ceasing pouring.

When beverages are to be dispensed from the carafe 30 a user grips the handle 36 to remove the carafe from the brewer or warmer for serving. The carafe 30 can then be moved to a desired location relative to a cup so that beverage can be poured using a pouring assembly 50. The general use of the carafe 30 is familiar to the user of the disclosed carafe. It should be noted that while a specific handle is shown other forms of handles could be used with this design and as such the handle structure should not limit the scope of the present disclosure. For example a handle or grip could be formed in the container instead of being provided in a part attached to the container. The handle 36 is used to tip the container 32 so that beverage 51 in the container 32 (see, FIG. 6) is moved towards the pouring assembly 50. As the angle of tip of the container 32 is increased beverage 51 will start to flow through a mouth 52 defined in a portion of the container 32 by a rim 54. A leading edge of the rim 54 defines a lip 56 over which beverage must flow to exit the carafe 30. Generally, the rim 54 defines the edge of the mouth 52 relative to the container 32. The rim 54 is generally positioned along a protruding portion or transition zone 65 extending from a wall 62 of the container 32. The rim 54 as shown forms a generally V-shaped structure with the transition zone 65 in the area defining the mouth 52. The V-shaped structure comes together in a generally curved area defining a pouring spout 57 which terminates in the lip 56 which is generally a curved intersection of the two legs of the rim 54.

The container 62 can be formed from a variety of techniques all of which should be incorporated herein by way of illustration and not limitation. In one embodiment, the container 62 is formed by blow molding, injection molding, vacuum forming, or any other technique using a volume of heated glass using generally known techniques. The container 32 is formed with a wall having a configuration as shown in the drawings or any other configuration which might be appropriate, useful, or desirable for a beverage serving carafe. As shown in the drawings, the container 32 is generally cylindrical having a domed upper portion 59 terminating in a generally circular opening 61. During the forming of the container 32 using one technique the opening 61 is generally circular because the mouth 52 has not yet been formed. As an additional operation of forming the container 32 the area near the mouth 52 is at least locally heated to facilitate forming of the V-shaped mouth 52. A mold or jig is used to achieve the desired shape from the surrounding material. A finishing step may be used to treat the edge of the opening and the rim 54 to avoid sharp or to produce an otherwise desirable surface finish. The result of these forming operations is a container 32 with a formed pouring structure 63.

The container 32 may alternatively be formed of plastic, metal or any other material currently known or hereafter discovered applicable for use as a beverage container. While the forming operations may be different than that of the glass container as described above, the description of the glass container is provided as an illustration of an embodiment and not all embodiments. Additional embodiments and materials should be included to expansively define the scope of the present disclosure and not limit it.

Figure 8:
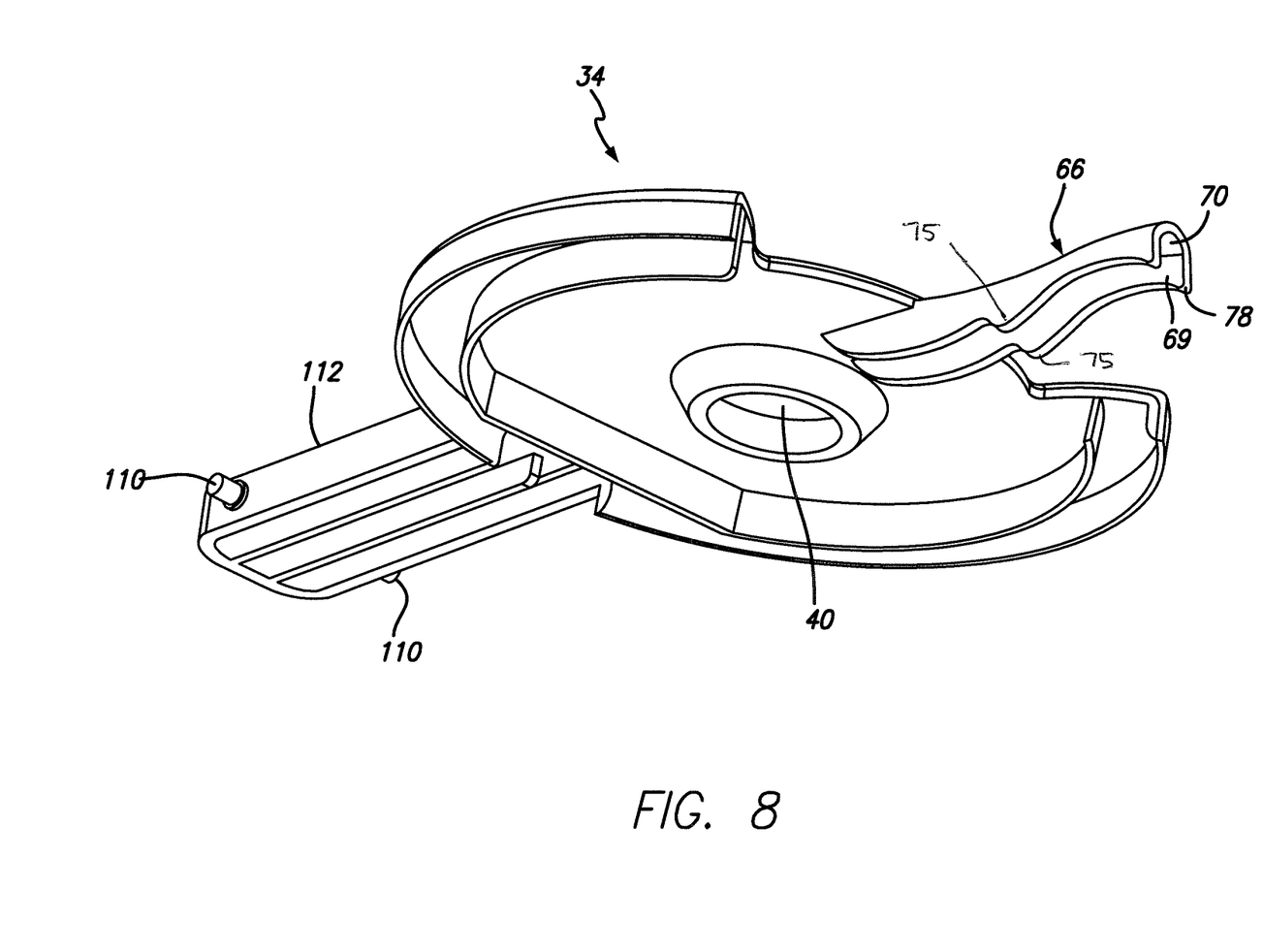
FIG. 8 is a bottom perspective view of the lid portion of the pouring assembly additionally showing features of the extending portion.

The pouring assembly 50 includes the pouring structure 63 as well as additional features which will be described below. The pouring assembly 50 also includes an elongated extension 66 connected only at one end to lid portion 34 and which projects in a cantilevered fashion (e.g., see FIG. 8) from the lid portion 34. The extension 66 extends from the container generally through the mouth 52 and is oriented relative to the lip 56 of the spout 57. Orientation relative to the lip 56 helps facilitate directional flow of beverage 51 through the mouth 52 (see, FIG. 6). The extension 66 also provides engagement with a stream of liquid 53 (see, FIG. 6) flowing through the mouth 52, rim 54, and lip 56 to prevent formation of drips at the conclusion of pouring. At the conclusion of pouring, interaction between the reducing flow or stream 53 causes retention of a final small amount or volume of liquid flowing through a channel 70 in the extension 66 and the mouth 52 to sufficiently retain it and return it to the cavity 42 of the container 30. More details will be provided about this interaction below.

It should be noted that the extension 66 is shown generally as a protruding member having the channel 70 defined therein and extending therethrough. However, the extension 66 may take any form currently known or subsequently developed to provide the drip reducing or preventing function as described herein. Additionally, the surfaces of the extension may be treated, formed, coated or otherwise provided to facilitate various characteristics. Such characteristics may include increased surface tension, increased directional flow, increased aeration of liquid, and/or directional return of liquid to the cavity of the container.

Additionally, the disclosure shows an extension 66 which is integrally formed with the lid 34. However, it is anticipated and completely included within the disclosure to have an extension 66 which can be removably attached to the lid and/or removably retained on the lid or the container. In other words, the lid 34 can be formed with structures which are used to attach a separate extension 66 to the lid 34 for use as described herein. Additionally, the extension 66 may be movable relative to the lid such as by means of a sliding channel, sliding flange, pivot, or other structures. Retained movement of the extension 66 on the lid 34 may facilitate displacement of the extension relative to the lid for use in containing the extension during shipping, making adjustments of the extension relative to the lid, or to displace the extension relative to the lid if the user selects to not use the extension. Additionally, the extension can be formed of a material other than material used to form the lid. In this regard, it may be desirable for purposes of cleaning, sanitation, liquid characteristics and dynamics as well as other reasons to use an extension formed of a different material than that used for the lid. The general broad concept of an extension used in conjunction with and a part of the pouring assembly is disclosed herein and all features currently known and hereafter discovered are intended to be included in this broad disclosure. These features are provided by way of illustration and not limitation.

Figure 4:
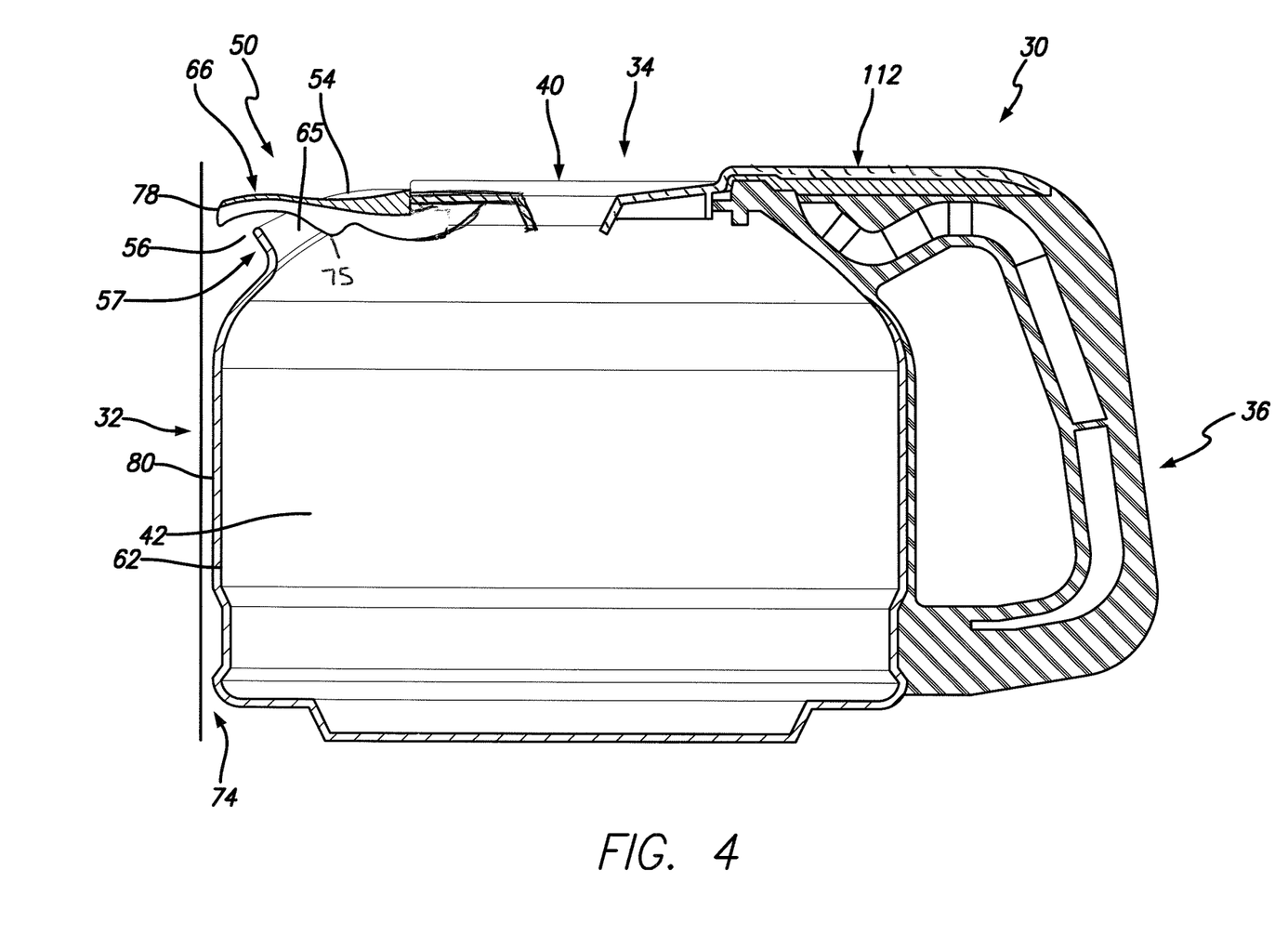
FIG. 4 is a cross sectional side elevational view of the carafe as shown in FIG. 2 taken along the line 4-4 in FIG. 1 showing the relationship of an extension associated with the lid assembly extending at least partially through a mouth of the container relative to a lip defined along a rim of the mouth.

With reference to FIG. 4, the disclosed configuration shows an embodiment in which a line 74 representing an edge of a brewer body does not contact a leading edge 78 or the lip 56 of the carafe 30. This may be useful in some situations since it may be desirable to not contact other surfaces with the structures of the carafe 30. In other words, if there are particles which might alter the flavor, contaminate the beverage, or otherwise are undesirable the ability to provide an assembly having dimensions and structures which do not contact such surfaces could be of use. In this regard, with the carafe 30 sitting at a position underneath a brewer (shown generally, abstractly with surface 74) an exterior surface 80 of the container 32 wall 62 may abut the brewer surface 74 and prevent contact with the leading edge 78 and the lip 56. One of the challenges associated with creating a drip free carafe in this configuration is to provide a rim 54 and a lip 56 having sufficient area to allow a controlled flow of beverage while pouring and complete pouring from the carafe or draining of the carafe without creating a difficult pouring angle for the user gripping the carafe handle. The pouring assembly top 50, in addition to preventing dripping, also helps control the flow of beverage from the container through the mouth 52.

Figure 5:
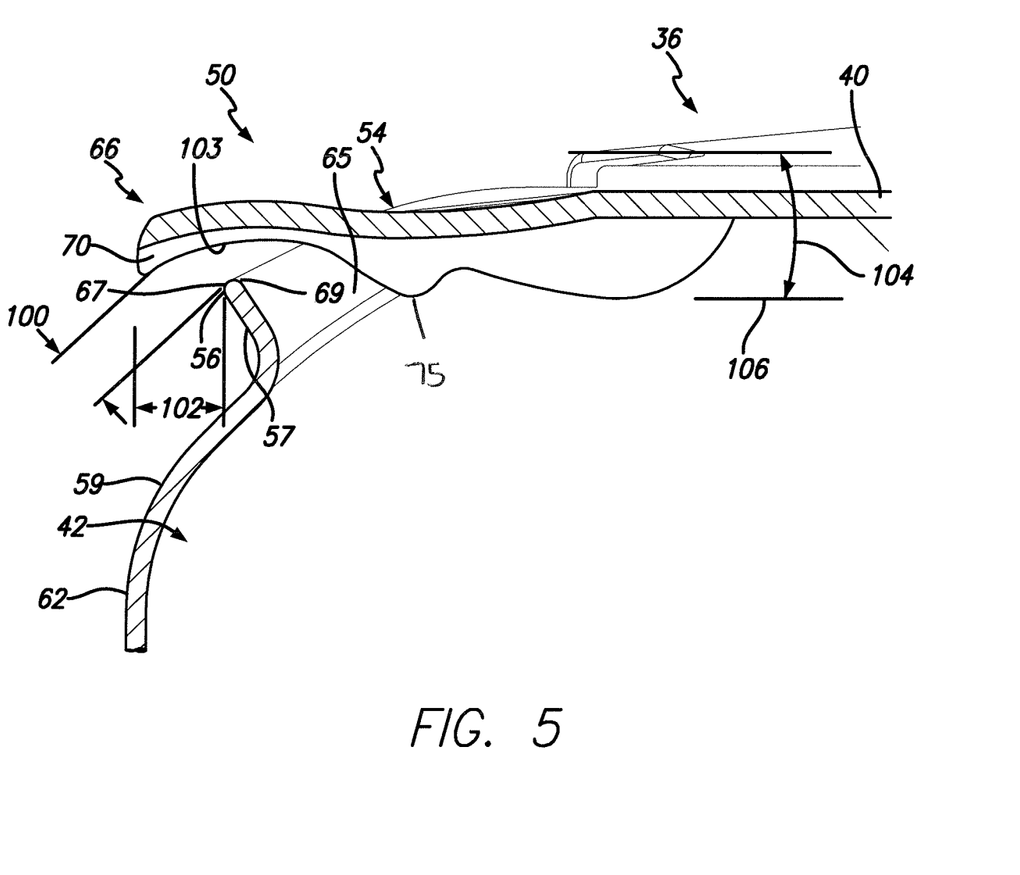
FIG. 5 is an enlarged partial fragmentary, cross sectional view of the pouring assembly from FIG. 4 showing the relationship between the extending portion of the pouring assembly, additionally showing relationships between the extending portion and the lip.

As shown in FIGS. 4 and 5, the extension 66 includes a pair of fins 75 positioned on either side of the channel 70. While in one embodiment the bellies or fins 75 are not provided the illustrated embodiment shows the fins 75. These fins 75 are generally downwardly protruding portions of the channel 70 walls which help provide increased surface area within the channel 70 to help enhance surface tension I the liquid in the channel 70 and facilitate drawing liquid back into the cavity 42 of the container 32 when the carafe 30 is in the upright position. While one configuration may include a channel 70 without the fins 75 the illustrated embodiment includes these additional surface area features to show a preferred embodiment. The specific embodiment as shown in the figures is intended to be included within the scope of the claims as well as all other variations on this embodiment. When the carafe 30 is in the upright resting position as shown in FIG. 4 any liquid retained in the area of the extension 66, channel 70, and lip 56 of the mouth 52 will tend to be drawn back into the cavity by capillary action. When the liquid accumulates within the space 79 (see FIG. 8) between the fins 75 it will tend to be drawn towards and accumulate near the lowest portion 81 of each fin 75 and if sufficient liquid is accumulated there it will tend to drip back into the cavity.

With regard to FIG. 5, the relative angles and range of dimensions are provided and discussed. The dimension 100 between the leading edge 78 of the extension 66 helps define and control the wicking action along with the channel 70 of the pouring assembly 50. If dimension 100 is too large the stream 53 (see, FIG. 5) flowing through the pouring assembly may become diffused and lack some degree of coherence. If dimension 100 is too small the pour can be slow and may produce a relatively narrow stream. Too narrow of a stream can result in a very slow pour which could also be undesirable. As such it is desirable to find a dimension between these ranges which facilitates stream control while still providing a sufficient volume during the pour.

Dimension 100 is important because it provides a distance between the lip 56 and the extension 66 to help provide some vertical dimension away from the lip 56. This dimension 100 interacts with or relates to dimension 102 to facilitate to a pouring trajectory away from the container 32 and into the cup or other secondary container. A curved section 103 is also provided in the end 78 generally proximate to the lip 56. The curve 103 prevents a sharp or abrupt surface which otherwise might tend to break the surface tension between the liquid in the channel 70 at the end of a pour. The curve 103 is generally selected from a range of curves or within a range of curves which may be matched to a natural trajectory of the liquid flowing out from the mouth 52 and the liquid as it is drawn back in at the end of a pour.

Dimension 102 is useful to help facilitate pouring beyond the wall 62 of the container 32. In other words, if the dimension 102, generally the horizontal distance between the leading edge 78 of the extension 66 and the lip 56 is too small the stream will not flow sufficiently away from the carafe 30 but will generally follow a downward path along the carafe wall. In other words, the flow could become pinched between these two points or areas and could tend to follow a downward flow as opposed to an arching flow away from the carafe 30 wall 62. If this dimension 102 is too large the flow becomes diffused and lacks sufficient coherency. As such it is desirable to find a range of dimensions which will still provide an arch away from the container while pouring a range of pouring angles while maintaining coherence of the pouring stream.

If the dimension 102 extending between the edge 78 and the lip 56 is too short relative to these structures it may not provide sufficient benefits when pouring to give the flow of liquid through the channel 70 and over the lip 56, including around corresponding surfaces of the extension 66, a long enough path or launch trajectory away from the container 30. Additionally, if the dimension 102 is to short, the benefits associated with catching or retaining a drip may be reduced. If the dimension 102 is too long it may reduce the capillary action created in the channel 70 to otherwise pull the drip back into the cavity 42 of the container 32. A reduced capillary action or effect may result in a drip dangling or being retained on the end 78. The fins 75 described above can help facilitate or promote the capillary action of the channel 70 structure. It is desirable to find a range of dimensions 110, 102, curves 103, cross sectional voids of the channel 70, and surface areas (including, perhaps the surface area provided by fins 75) to provide a controlled capillary effect. These effects may be different depending on the surface tension characteristics of the liquid being dispensed from the container 32 and may be effected by the surface tension characteristics of the corresponding materials which the beverage compacts.

The angle 104 relative to a horizontal dimension along the top of the carafe 30 and the extension body plane 106 is useful to help produce desirable wicking performance. During a slow pour, especially when there is a large volume of beverage in a container, this angle 104 helps to facilitate directed flow along the extension 66, through the mouth and pouring assembly along a stream as defined by the previously discussed dimensions. The fins 75 can also help provide a more laminar flow through the mouth 52 when a large volume is being poured. If angle 104 is too large it will tend to reduce the flow which might cause a user to increase the angle of pouring attack. This could result in beverage flowing through the opening 40 as opposed to the mouth. If this angle is too low the liquid flowing towards the extension 66 will not tend to flow along the extension and would rather pour around the extension. The angle 104 helps provide engagement between the surface of liquid in the container being poured from the container and the corresponding surfaces of the extension 66. This helps to channel or direct the flow along a desirable flow path through the mouth 52.

As noted above, the angle 104 may be a range of angles. If the angle 104 is greater than that shown in FIG. 5, it likely would be little if any detrimental effect. An increase angle 104 may result in somewhat greater capillary action as a quantity of liquid contacting the channel 70 may be drawn back into the cavity 42 at a slightly steeper angle. However, it is less desirable to decrease angle 104. A very shallow or horizontal angle 104 may cause liquid to be retained in the channel 70. While it is not undesirable to retain some liquid in the channel 70 since it will still retain drips from detaching from the extension 66 or lip 56, it may be desirable to evacuate the channel at the end of a pour. Evacuating the channel 70 at the end of a pour could be useful to prevent accumulation of beverage material in the channel which might otherwise evaporate leaving behind components of the beverage on the inner surface of the channel 70. While some residue could help promote dripping in the container from pour to pour it will be removed during regular cleaning. Generally, the cross sectional dimensions of the channel 70 can be selected to fit within the inner section of the V-shaped mouth 52, to not interfere with the flow through the mouth and to provide the desirable drip retaining characteristics of the channel 70 capillary action as described herein.

The lid assembly 34 is attached to the container generally in a pivoting fashion using the knuckle 110 on an arm 112 of the lid assembly 34. The knuckle is engaged in a corresponding recess 114 on the handle assembly 36 as shown in the illustrated embodiment. A variety of attachment configurations can be used to retain the lid assembly 34 on the overall assembly 30. The use of the pivot assembly 110, 114 helps to facilitate movement of the lid assembly 34 to disengage an annular groove 55 from the edge of the opening 61 for purposes of cleaning or other reasons. Additionally, the knuckle 110 and recess 114 can be configured, but is not limited to, to provide a snap fit or interference fit engagement. This will allow removal of the lid assembly 34 for cleaning. Separation of the components for cleaning can be useful to enhance cleaning action on the various surfaces. Additionally, the interaction between the knuckle and recess can be sized and dimensioned to provide some resistance between the lid assembly and the handle. In other words, the pivot can be designed to be less than freely moving. This can be useful to retain the lid assembly on the carafe 30 as well as to help retain the lid assembly over the opening 61 with the extension 66 engaging the lip 56.

During a pour, liquid flowing through the mouth 52 could cause some lifting of the extension 66 away from the lip, compared to a resting position where a portion of the extension 66 rests on the lip 56 area (see FIG. 5). However, as volume of the liquid flow at the end of a pouring event decreases the extension will tend to return to the generally resting position or relationship with the extension 66 abutting a corresponding surface of the lip 56. As the stream reduces remaining liquid in the channel 70 will be influenced by the capillary action which is useful to prevent a drip from extending from the container, and returning liquid to the container or at least retaining it in the channel 70.

A locking mechanism can be added to the arm 112, handle 36, or lid assembly 34 to enhance the retention of the lid 34 over the opening 61. Such a locking mechanism or retaining mechanism can be in the form of a slider which interacts between the various components and can be manually or otherwise adjusted by the user to retain the lid over the opening or to release the lid from the opening. Additionally, a biasing connection between the lid assembly 34 and the remainder of the assembly 30 can be provided. Such a biasing assembly may be in the form of an elastomeric or spring component attached between the arm 112 and the handle 36. This structure could provide disengagement of the lid 34 from the handle 36 when a user selects to do so or may provide a biasing force to return the lid 34 over the opening 61 when the biasing device is engaged.

With further reference to FIG. 5, it can be seen that the edge 69 of the channel 70 contacts the generally highest point of elevation 67 of the lip 56. In other words, the lip 56 is formed with a curved or beaded area with the highest point 67 of the bead configured at the point of contact with the extension 66. In this manner, the extension 66 generally only rests on this highest point 67. This interacting contact may be helpful in retaining drips on the inside of the container 32 and minimizing liquid which might otherwise develop on the outside of the container. If the assembly can be configured to reduce the amount of liquid on the outside of the container it can also be helpful in reducing the potential for dripping. While it is useful to provide a drip inside the cavity 42 it is not useful to allow a drip to form outside of the container.

In use, the carafe 30 includes a container 32 having the wall 62 defining the internal cavity 42. An upper opening 61 of the container 32 also includes a formed mouth 52 as defined by the transition area 65 generally intersecting in the V-shaped spout 57 with a pouring lip 56. The spout 63 defined by the elements of the mouth 52 and related structures defined above is included in a pouring assembly 50 which includes an extension 66 positioned through the mouth 52.

The extension 66 extends from a lid assembly 34 which provides, in the current embodiment, hinged attachments to the carafe 30 at the handle 36. The extension 66 defines a channel therethrough extending at least partially axially along the structure of the extension 66. The extension 66 has a point of contact 69 abutting the generally highest point 67 of the lip 56. The extension 66 and channel 70 along with the fins 75 defined by the structure 66 provides a capillary action to draw liquid or fluid back into the container 32 at the end of a pour. The extension 66 while shown as being formed on the lid 34 could be carried on or otherwise attached to the container 30 as a separate piece from the lid 34 providing all or some of the same functions as described in the present description.

A user uses the carafe 30 by gripping the handle or other structure on the carafe to angle the carafe to direct beverage 51 retained in the cavity towards the mouth 52. As pouring is initiated, the extension 66 helps promote a trajectory of liquid away from the lip 56 and into a receiving container or cup. The angle 103 of the extension 66 can be one of a range of angles which may be selected to promote the surface tension characteristics associated with the liquid or range of liquids which might be used with or otherwise contained in the container 30. The dimensions 100 and 102 are selected from ranges of dimensions to meet a variety of characteristics. For example, the dimension 102 needs to allow the tip 78 to be far enough away from the lip 56 to promote the trajectory as discussed above but also small enough so that the tip 78 to prevent contacting a corresponding surface 74 of a brewer in which the carafe 30 is positioned. Additionally, the carafe 30 may be positioned at the brewer to receive warming energy from the brewer if it includes a warming station. As such it may be desirable to maintain a distance between the leading edge 78 and the surface 74 as well as the lip 56 to prevent contact and associated results.

At the end of a pour the capillary action of the channel 70 generally tends to draw the small volume of liquid in the mouth area when the stream is ceased as the carafe is returned to a more horizontal position. The angle 104 and fins 75 help to work with the surface tension between the liquid and the inside surface of the channel/fins 70, 75 to draw the liquid back into the container thus preventing a drip from forming on the lip 56 or other surfaces. Enhancing the structures and functions of the present assembly provides a method of preventing drip formation.

The method of preventing of drip formation includes providing the structures as noted above, generally. When a pouring sequence is initiated the provided extension 66 does not interfere with the pouring and does not cause any problems for the stream form or path. In fact, the structure of the extension 66 can enhance the flow of the stream as indicated above. When a pouring event is being ended and the carafe 30 is being returned to a more horizontal position the stream will decrease and the decreasing volume of liquid flowing through the mouth will cause termination of the stream at some point. When the stream is terminated the capillary action of the interaction of the structures as noted above provide the step of drawing liquid which does not pour into the cup back along the channel 70 and into the container to prevent dripping.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A carafe for use in receiving, retaining, and dispensing liquid, the carafe comprising:
   a container;
   an opening formed on the container;
   a handle on the container;
   a mouth defined as a part of the opening by a protruding portion of the container extending outwardly from a wall of the container generally opposite the handle and through which liquid can be poured from the carafe;
   a lid covering a first portion of the opening and leaving at least a portion of a second portion of the opening uncovered with the second portion being defined by the mouth; and
   an elongated cantilevered extension defining a channel extending from the lid across the second portion of the opening defined by the mouth, with open areas of the mouth defined between the lid, the mouth, and the spaced apart sides of the extension positioned on both outer sides of the extension and not covered by the lid or extension, the extension extending outwardly from the container beyond a rim of the mouth, at least a portion of the channel of the extension contacting liquid from the container during pouring to direct flow of liquid from the container through the mouth and over the lip and to reduce the formation of drips from the container when ceasing pouring.

2. The carafe of claim 1, further comprising the extension contacting a rim of the mouth.

3. The carafe of claim 1, further comprising the extension and lid being removably attachable to one of the handle and container.

4. The carafe of claim 1, further comprising the extension and lid being movably retained on one of the handle and container.

5. The carafe of claim 1, further comprising the extension contacting and being movable by a stream of liquid flowing through the mouth during pouring for directing flow of liquid through the mouth.

6. The carafe of claim 1, further comprising the mouth forming a generally acute angle defining a pouring spout, the extension positioned proximate to at least a portion of the spout.

7. The carafe of claim 1, further comprising the extension having structure to provide surface tension with liquid flowing through the mouth when the carafe is tipped for pouring.

8. The carafe of claim 7, further comprising the extension defining a channel for producing capillary action with liquid flowing through the mouth.

9. The carafe of claim 8, the extension having walls defining the channel therebetween, the walls of the extension being configured and oriented to position the channel of the extension in the mouth in the path of flow through the mouth when pouring liquid for the carafe.

10. The carafe of claim 8, further comprising a portion of the extension positioned within the mouth oriented at least partially inwardly towards a cavity defined by the container for directing liquid in the channel at the end of pouring back into the cavity of the container and not dripping from the container.

11. The carafe of claim 8, further comprising a portion of the extension positioned within the mouth oriented at least partially inwardly towards a cavity defined by the container for directing liquid in the channel at the end of pouring back into the cavity of the container and not dripping from the container, and including at least one fin extending from a portion of the channel towards the cavity, the fin helping to laminate the stream of liquid flowing from the mouth while pouring and facilitating dripping into the cavity at the end of pouring.

12. The carafe of claim 1, further comprising the extension protruding into the mouth and spaced away from sides of the mouth.

13. The carafe of claim 1, further comprising a hole defined in a portion of the lid for allowing liquid to flow from above the carafe through the lid and into a cavity defined by the container to receive the liquid into the container.

14. The carafe of claim 1, further comprising a hinge attaching the lid to one of the handle and container to facilitate hinged retention and movement of the lid on the container.

15. A carafe for use in receiving, retaining, and dispensing liquid, the carafe comprising:
   a container having a wall defining a cavity therein;
   a portion of the wall providing a rim defining an opening to the cavity of the container;

a generally V-shaped mouth defined as a part of the opening by a protruding portion of the rim extending outwardly from a wall of the container and through which liquid can be poured from the container;

a lid covering a first portion of the opening while leaving at least a portion of a second portion of the opening uncovered with the second portion being defined by the V-shaped mouth; and an elongated cantilevered extension defining a channel extending from the lid, the extension extending from the lid across an opening defined by the mouth and beyond the lip of the mouth, with open areas of the mouth on both outer sides of the extension and not covered by the lid or extension, at least a portion of the channel of the extension contacting and directing liquid from the container during pouring to direct flow of liquid from the container through the mouth and over the lip and to reduce the formation of drips from the container when ceasing pouring.

16. The carafe of claim 15, further comprising a handle attached to the container for gripping to tip the container and pour liquid therefrom, the handle being positioned generally opposite the mouth for directing liquid through the mouth.

17. The carafe of claim 15, further comprising a hinge attaching the lid to one of the handle and container to facilitate hinged retention and movement of the lid relative to the container.

18. The carafe of claim 15, the mouth forming a generally acute angle defining a pouring spout, the extension positioned proximate to at least a portion of the spout, the extension contacting and being movable by a stream of liquid flowing through the spout during pouring for directing flow of liquid through the spout.

19. The carafe of claim 15, the extension having walls defining a channel for producing capillary action with liquid flowing thought the mouth, the walls of the extension being configured and oriented to position the channel of the extension in the mouth in the path of flow through the mouth when pouring liquid from the carafe.

20. The carafe of claim 15, further comprising a portion of the extension positioned within the mouth oriented at least partially inwardly towards the cavity defined by the container for directing liquid in the channel at the end of pouring back into the cavity of the container and not dripping from the container.

21. The carafe of claim 15, further comprising a portion of the extension positioned within the mouth oriented at least partially inwardly towards the cavity for directing liquid in the channel at the end of pouring back into the cavity and not dripping from the container, and including at least one fin extending from a portion of the channel towards the cavity, the fin helping to laminate the stream of liquid flowing from the mouth while pouring and facilitating dripping into the cavity at the end of pouring.

22. The carafe of claim 15, further comprising the extension protruding into the mouth and spaced away from sides of the mouth.

23. The carafe of claim 15, further comprising a hole defined in a portion of the lid for allowing liquid to flow from above the carafe though the lid and into a cavity defined by the container to receive the liquid into the container.

24. A lid for use with a carafe used to receive, retain, and dispense liquid;

the carafe including a container having a wall defining a cavity, an opening formed on the upper part of the wall of the container, a handle provided on the container, a generally V-shaped mouth defined as a part of the opening by a protruding portion extending outwardly from a wall of the container generally opposite the handle through which liquid can be poured from the container;

the lid having a hole for receiving a stream of liquid flowing into the container, the lid is sized and dimensioned for covering a first portion of the opening of the container while leaving a second portion of the opening uncovered with the second portion being defined by the mouth, an elongated cantilevered extension defining a channel carried on the lid and extending from the lid across the second portion of the opening defined by the mouth, with open areas of the mouth defined between the lid, the mouth, and the spaced apart sides of the extension positioned on both outer sides of the extension and not covered by the lid or extension, the extension extending outwardly from the container beyond an outer edge of the mouth, and at least a portion of the channel of the extension interacting with fluid during pouring and after ceasing pouring to facilitate the flow of liquid from the container through the mouth and to reduce the formation of drips from the container upon ceasing pouring.

25. The lid of claim 24, further comprising the extension being integrally formed with the lid of a single material.

26. The lid of claim 24, the extension having walls defining a channel for producing capillary action with liquid flowing through the mouth of the carafe, the walls of the extension being configured and oriented to position the channel of the extension in the mouth in the path of flow through the mouth when pouring liquid from the carafe.

27. The lid of claim 24, further comprising a portion of the extension sized and dimensioned for positioning within the mouth and oriented at least partially inwardly towards the cavity for directing liquid in the channel at the end of pouring back into the cavity and not dripping from the container, and including at least one fin extending from a portion of the channel towards the cavity, the fin helping to laminate the stream of liquid flowing from the mouth while pouring and facilitating dripping into the cavity at the end of pouring.

28. The lid of claim 24, further comprising a hole defined in a portion of the lid for allowing liquid to flow from above the lid though the lid and into a cavity defined by the container to receive the liquid into the container.

29. A beverage maker for combining ingredients to produce a beverage, the beverage maker including a carafe for receiving beverage from the beverage maker and retaining the beverage for dispensing, the carafe comprising:

a container having a wall defining a cavity therein;

an opening formed on the container;

a handle on the container;

a generally V-shaped mouth defined as a part of the opening by a protruding portion extending outwardly from the wall of the container generally opposite the handle and through which liquid can be poured from the container;

a lid covering a first portion of the opening while leaving at least a portion of a second portion of the opening uncovered with the second portion being defined by the V-shaped mouth; and an elongated cantilevered extension defining a channel extending from the lid extending across at least a portion of the second portion of the opening defined by the mouth, the extension extending outwardly from the container beyond an outer edge of the mouth, with open areas of the mouth on both outer sides of the extension and not covered by the lid or extension, at least a portion of the channel of the extension contacting beverage from the container during pouring to direct flow of beverage from the container through the mouth and to reduce the formation of drips from the container when ceasing pouring.

30. A method of pouring liquids from a carafe, the method including the steps of:

providing a carafe for use in receiving, retaining, and dispensing liquid, the carafe including a container, an opening formed on the container, a handle provided on the container, a mouth defined as a part of the opening by a protruding portion of the container extending outwardly from a wall of the container and through which liquid can be poured from the container, the mouth positioned generally opposite the handle, and a lid portion associated with the carafe and covering a first portion of the opening while leaving at least a portion of a second portion of the opening uncovered with the second portion being defined by the mouth;

providing an elongated cantilevered extension defining a channel extending from the lid across the second portion of the opening defined by the mouth of the carafe, with open areas of the mouth defined between the lid, the mouth, and on both outer sides of the extension and not covered by the lid or extension, the extension extending outwardly from the container beyond an outer edge of the mouth, at least a portion of the channel of the extension interacting with fluid during pouring to facilitate the flow of liquid from the container through the mouth and to enable flow around the at least a portion of the elongated cantilevered extension extending through empty space across the second portion of the opening and after ceasing pouring to reduce the formation of drips from the container upon ceasing pouring;

positioning the container to promote the movement of liquid in the container towards the mouth;

passing liquid through the mouth of the container and interacting with at least a portion of the elongated cantilevered extension;

initiating cessation of pouring of liquid through the mouth; and retaining of liquid by surface tension on the at least a portion of the channel of the elongated cantilevered extension to reduce the formation of drips when pouring is completely ceased.

* * * * *